(12) United States Patent
Schellekens et al.

(10) Patent No.: US 9,340,699 B2
(45) Date of Patent: May 17, 2016

(54) AQUEOUS OLIGOMER / POLYMER EMULSION WITH CATIONIC FUNCTIONALITY

(71) Applicant: DSM IP ASSETS B.V., Heerlen (NL)

(72) Inventors: Michael Arnoldus Jacobus Schellekens, Waalwijk (NL); John Geurts, Waalwijk (NL); Tijs Nabuurs, Waalwijk (NL); Gerardus Cornelis Overbeek, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/153,865

(22) Filed: Jan. 13, 2014

(65) Prior Publication Data

US 2014/0127153 A1    May 8, 2014

Related U.S. Application Data

(63) Continuation of application No. 13/856,341, filed on Apr. 3, 2013, now abandoned, which is a continuation of application No. 13/536,883, filed on Jun. 28, 2012, now abandoned, which is a continuation of application No. 12/594,704, filed as application No. PCT/EP2008/054042 on Apr. 3, 2008, now abandoned.

(30) Foreign Application Priority Data

Apr. 5, 2007   (EP) ..................... 07007164

(51) Int. Cl.

| C08F 293/00 | (2006.01) |
|---|---|
| C08F 2/38 | (2006.01) |
| C08F 2/22 | (2006.01) |
| C08F 8/00 | (2006.01) |
| C09D 151/00 | (2006.01) |
| C08L 53/00 | (2006.01) |
| C09D 153/00 | (2006.01) |
| C09D 5/14 | (2006.01) |

(52) U.S. Cl.
CPC ........ *C09D 151/003* (2013.01); *C08F 293/005* (2013.01); *C08L 53/00* (2013.01); *C09D 5/14* (2013.01); *C09D 153/00* (2013.01); *C09D 153/005* (2013.01); *C08F 2438/03* (2013.01); *Y10T 428/31855* (2015.04); *Y10T 428/31938* (2015.04)

(58) Field of Classification Search
CPC ............ C08F 293/00; C08F 2/38; C08F 2/22; C08F 8/00
USPC ............................ 526/201; 524/457; 525/916
See application file for complete search history.

(56) References Cited

U.S. PATENT DOCUMENTS

| 5,763,548 A | 6/1998 | Matyjaszewski et al. |
|---|---|---|
| 5,945,491 A | 8/1999 | Matyjaszewski et al. |
| 6,174,953 B1 | 1/2001 | Huybrechts |
| 2006/0270795 A1 * | 11/2006 | Goebelt et al. ............. 525/92 R |

FOREIGN PATENT DOCUMENTS

| CN | 1 616 498 | 5/2005 |
|---|---|---|
| EP | 1 205 492 | 5/2002 |
| EP | 1 533 327 | 5/2005 |
| EP | 1533327 | 5/2005 |
| EP | 1533327 A1 * | 5/2005 |
| EP | 1 698 666 | 9/2006 |
| WO | 03/055919 | 4/2003 |
| WO | 03/055919 A1 | 7/2003 |
| WO | WO 03055919 A1 * | 7/2003 |
| WO | 2004/056880 | 7/2004 |

* cited by examiner

*Primary Examiner* — Kelechi Egwim
(74) *Attorney, Agent, or Firm* — Nixon & Vanderhye P.C.

(57) ABSTRACT

An aqueous emulsion comprising at least a covalently bound vinyl oligomer and vinyl polymer, wherein said vinyl oligomer comprises 5 to 85 mol % of vinyl monomers bearing quaternary ammonium ion functional groups or quaternisable amine functional groups and is obtained by a controlled radical polymerisation of at least one vinyl monomer via a reversible addition-fragmentation chain transfer mechanism in solution in the presence of a control agent and a source of free radicals; wherein said vinyl polymer is obtained by emulsion polymerisation of vinyl monomers in the presence of the vinyl oligomer; wherein the weight % ratio of vinyl oligomer to vinyl polymer is in the range of from 0.5:99.5 to 65:35.

21 Claims, No Drawings

AQUEOUS OLIGOMER / POLYMER EMULSION WITH CATIONIC FUNCTIONALITY

This application is a continuation of U.S. application Ser. No. 13/856,341, filed Apr. 3, 2013 (now abandoned) which is a continuation of U.S. application Ser. No. 13/539,883, filed Jun. 28, 2012 (now abandoned) which is a continuation of U.S. application Ser. No. 12/594,704, filed Jan. 8, 2010 (now abandoned), which is the national phase application of international application PCT/EP2008/054042, filed Apr. 3, 2008 which designated the U.S. and claims benefit of EP 07007164.2, dated Apr. 5, 2007, the entire contents of each of which are hereby incorporated by reference.

The present invention relates to an aqueous emulsion comprising covalently bound vinyl oligomer polymers, said vinyl oligomers bearing quaternary ammonium ion or quaternisable amine functional groups, where the vinyl oligomer is obtained by a controlled radical polymerisation process using a control agent, processes for the preparation of such vinyl oligomer polymers and their use as coatings.

It is well known that the chemical and physical properties of coatings are controlled by a careful design of the components reacted together and by the specific processes used for preparing the coating compositions. Often, components having specific functionalities are included to obtain coatings that have for example antimicrobial, antibleeding or antistatic properties.

For example, for antimicrobial coating applications various surfactants and polymers containing cationic functional groups are widely used. Antimicrobial is a term that includes resistance against bacteria, viruses, fungi and algae. Since membranes of bacterial cells are in general negatively charged, cationic functional groups such as quaternary ammonium ion functional groups may adhere onto the membrane of the cell through electrostatic interaction, followed by the disruption of the membrane and subsequent leakage and death of the cell. Quaternary ammonium ion functional groups are generally recognised as being safe for mammalians.

Soluble polymers comprising quaternary ammonium ion functional groups are usually considered as effective antibacterial agents. However the addition of low molecular weight antimicrobial additives such as quaternary ammonium ion functional group based surfactants or quaternary ammonium ion functional group based waterborne polymers to polymeric binders used for coatings is not ideal as there is the potential of leaching of these materials from the coating (for example due to water exposure) which may result in decreased antimicrobial activity over time, and may additionally result in environmental issues. A longer term antimicrobial activity may be provided by building in quaternary ammonium ion functional groups into the polymeric binder material. However, it has been found that in the preparation of quaternary ammonium ion functional group based waterborne polymeric binders via for example a conventional emulsion polymerisation process it is difficult to prevent the formation of additional leachable cationic functional group containing waterborne polymeric material.

Coatings having antibleeding properties are also very interesting. In general, conventional aqueous based polymeric topcoats require the use of a primer undercoat to provide adequate adhesion to wood and previously painted surfaces. It is also known that wood constituents, such as tannin and lignin, which are present in woods such as redwood, cedar, mahogany and merbau, become extracted from the wood and migrate through the coating and lead to the formation of spots on topcoats, particularly under the action of moisture, which is often also described as "bleeding". Repeated applications of the same or a similar type of aqueous polymeric coating will not successfully prevent these stains from reappearing on the new coating surface.

To try to prevent this, additional layers, such as primers, are applied to the surface of the wood before coating. To date, solvent based primers based on for example polyurethane and epoxy resin coating materials are often effective in blocking the stains, as the coating solvent does not dissolve the wood constituents. However, solvent based coatings are clearly not preferred from an environmental point of view. Alternatively, coatings based on waterborne vinyl polymers which contain quaternary ammonium ion functional groups can also be used to prevent stain formation in wood coatings (as for example disclosed in U.S. Pat. No. 3,847,857), as these groups can block the diffusion of the wood constituents in the coating. However, as described above, the addition of low molecular weight additives or polymers bearing quaternary ammonium ion functional groups to waterborne polymeric binders for wood coatings may result in decreased stain blocking activity over time due to potential leaching.

Antistatic coatings are also desirable for many applications, such as polymeric film materials used in packaging. However polymeric films have the tendency to develop a built up static charge when subjected to frictional forces during manufacture, processing, conversion, use and the like. The nonconductive nature of most polymeric films allows for an accumulation of high electrostatic potential. The electrostatic charges attract not only dust and other contaminants, but additionally attract other polymeric films, causing for example film blocking during processing.

Antistatic coatings such as polymeric binders in combination with a quaternary ammonium salt can minimize or eliminate any detrimental build-up and discharge of static electricity on the film or other surface. However, the coatings are often easily removed from the surface by contact or by using organic solvents or water during further processing of the polymeric film.

There is an increased range of polymerisation methods available for adaptation to polymerisations to make waterborne polymers for various applications. A problem often encountered in the preparation of conventional waterborne copolymers is that the level of control over the polymer chain architecture and chain composition is often insufficient to attain the desired final application properties. For example, it has been found that especially for waterborne polymers prepared using an emulsion polymerisation process, a significant amount of hydrophilic comonomers are polymerised in the aqueous phase. This means that the use of waterborne comonomers bearing quaternary ammonium ion functional groups for obtaining coatings with antimicrobial, antistatic or antibleed properties is likely to result in an inhomogeneous incorporation and consequently a reduced efficiency of these functional monomers. In addition, the performance level of the coating in terms of antimicrobial, antistatic or antibleeding properties may be insufficient and or decrease over time due to potential leaching.

In particular controlled radical polymerisation techniques such as nitroxide mediated polymerisation (NMP), atom transfer radical polymerisation (ATRP), and degenerative transfer techniques such as reversible addition-fragmentation chain transfer (RAFT) polymerisation have been investigated as means to control polymer chain composition and architecture.

EP 1533327 describes a process for producing homo- and co-polymers by RAFT polymerisation in emulsion, by complexing a RAFT agent with a phase transfer agent to solubilise it in water and polymerising monomers in the presence of free radicals to form a polymer.

WO 03/055919 discloses a method for preparing an aqueous dispersion of polymer particles by preparing an aqueous dispersion, wherein the dispersed organic phase comprises ethylenically unsaturated monomers and an amphiphilic RAFT agent as a stabiliser and further polymerising the unsaturated monomers under control of RAFT agent to form an aqueous dispersion of polymer particles.

EP 1698666 describes unsaturated polyester resin mixtures stabilized with respect to demixing which can be cured by applying external pressure and which comprise an unsaturated polyester resin; an ethylenically unsaturated monomer; a shrinkage-reducing component; an inert filler; a reinforcing fibre; and from 0.01 to 1% by weight of a block copolymer.

EP 1205492 describes a method for forming polymer by forming a miniemulsion comprising an aqueous solution and a non-aqueous solution including polymerisable monomers and a transfer agent for RAFT reaction, followed by reacting of the miniemulsion in the presence of an initiator to form a polymer.

U.S. Pat. No. 5,763,548 discloses an ATRP process comprising the radical (co)polymerisation of monomers like styrene, (meth)acrylates and other radically polymerisable monomers in the presence of an initiator and a catalyst system that comprises a transition metal compound.

General methods for preparing aqueous vinyl polymers are reviewed in the Journal of Coating Technology, volume 66, number 839, pages 89 to 105 (1995).

We have now surprisingly found that according to the present invention the reversible addition-fragmentation chain transfer (RAFT) polymerisation process provides a useful route for preparing a waterborne vinyl polymer composition comprising covalently bound vinyl oligomer polymers bearing quaternary ammonium ion or quaternisable amine functional groups (i.e. a cationic functionality). Such vinyl oligomer polymers and compositions comprising them can be used to provide polymeric binders that enable the cationic functionality not to be removable from the coating by chemical or physical means; therefore such a polymeric binder can be used to provide antimicrobial polymeric coatings, antibleeding coatings and antistatic coatings with non-leachable components. Additionally such vinyl oligomer polymers may result in the quaternary ammonium ion functionality being effectively concentrated at the resulting particle surface, which gives a better effectiveness and allows lower amounts of monomers containing quaternary ammonium ion or quaternisable amine functional groups to be used.

According to the invention there is provided an aqueous emulsion comprising at least a covalently bound vinyl oligomer and vinyl polymer, wherein said vinyl oligomer comprises 5 to 85 mol % of vinyl monomers bearing quaternary ammonium ion functional groups and/or quaternisable amine functional groups and is obtained by a controlled radical polymerisation of at least one vinyl monomer via a reversible addition-fragmentation chain transfer mechanism in solution in the presence of a control agent and a source of free radicals; wherein said vinyl polymer is obtained by radical emulsion polymerisation of vinyl monomers in the presence of the vinyl oligomer; wherein the weight % ratio of vinyl oligomer to vinyl polymer is in the range of from 0.5:99.5 to 65:35.

For clarity, the terms: monomer, (vinyl) oligomer, (vinyl) polymer, block, block copolymer and control or transfer agent are intended to cover the singular as well as the plural. Furthermore, vinyl monomers are also referred to as ethylenically unsaturated monomers.

Preferably the vinyl oligomer comprises 5 to 85 mol % of vinyl monomer bearing quaternary ammonium ion functional groups.

Preferably the vinyl oligomer polymer bearing quaternary ammonium ion functional groups and/or quaternisable amine functional groups provides a permanent cationic surface in a resultant coating.

The vinyl oligomer and vinyl polymer of the invention emulsion are covalently bound, however the aqueous emulsion of the invention may also contain free vinyl oligomer and free vinyl polymer. For clarity, the terms total amount of vinyl oligomer or vinyl polymer are intended to cover the covalently bound as well as the free vinyl oligomer or vinyl polymer. In the same manner, the terms amount of monomers in the vinyl oligomer or vinyl polymer are intended to cover the covalently bound as well as the free vinyl oligomer or vinyl polymer.

Preferably the aqueous emulsion comprises:
a) 10 to 100 wt % of said covalently bound vinyl oligomer polymer;
b) 0 to 40 wt of free vinyl oligomer;
c) 0 to 90 wt % of free vinyl polymer;
wherein a)+b)+c) add up to 100%.

Even more preferably the aqueous emulsion comprises:
a) 20 to 100 wt % of said covalently bound vinyl oligomer polymer;
b) 0 to 40 wt of free vinyl oligomer;
c) 0 to 80 wt % of free vinyl polymer;
wherein a)+b)+c) add up to 100%.

The weight % ratio of vinyl oligomer to vinyl polymer (whether covalently bound or free) is preferably in the range of from 0.5:99.5 to 65:35, more preferably 1:99 to 60:40, especially 2:98 to 55:45 more especially 3:97 to 50:50 and most especially between 4:96 to 45:55.

The Tg of a vinyl oligomer or a vinyl polymer herein stands for the glass transition temperature and is well known to be the temperature at which a vinyl polymer (or vinyl oligomer) changes from a glassy, brittle state to a rubbery state. Tg values of polymers may be determined experimentally using techniques such as Differential Scanning calorimetry (DSC) or calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation "$1/T_g = W_1/T_{g_1} + W_2/T_{g_2} + \ldots + W_n/T_{g_n}$". The calculated Tg in Kelvin may be readily converted to ° C.

Preferably the overall Tg of the vinyl oligomer is in the range of from −100° C. to 20° C. The advantage of having such low Tg vinyl oligomer is that it gives good flexibility of the oligomer, which is advantageous for good (self-)dispersability of the oligomer, and can also positively affect antistatic, antibleeding or antimicrobial properties because of good diffusion capabilities.

Preferably the Tg of the vinyl polymer is ≥0° C. and more preferably ≥15° C. The advantage of having a higher Tg for the vinyl polymer is that is gives good mechanical properties and a coating with a low tack.

The weight average molecular weights (Mw) or number average molecular weights (Mn) of the vinyl oligomer and vinyl polymer may be determined by using gel permeation chromatography (GPC).

Preferably the vinyl oligomer has a number average molecular weight Mn≤50,000. Preferably the Mn of the vinyl oligomer is in the range of from 600 to 50,000 g/mol and more preferably 1,500 to 30,000 g/mol. Preferably the vinyl oligomer has a polydispersity index in the range from 1.1 to 3 and more preferably from 1.2 to 2.5. The polydispersity index (PDi) is defined as being the ratio Mw/Mn.

Preferably the vinyl polymer has a Mw≥10,000 g/mol, more preferably ≥25,000 g/mol, and most preferably ≥35,000 g/mol.

Preferably the weight average molecular weight (Mw) of the covalently bound vinyl oligomer-vinyl polymer is ≥20,000 g/mol and more preferably is ≥30,000 g/mol. Preferably the Mw of the covalently bound vinyl oligomer-vinyl polymer is ≤750,000 g/mol and more preferably ≤500,000 g/mol.

Preferably the vinyl oligomer has an acid value in the range ≤50 mgKOH/g, more preferably ≤20 mgKOH/g, even more preferably ≤5 mgKOH/g and especially 0 mgKOH/g of vinyl oligomer.

Preferably the vinyl polymer has an acid value≤50 mgKOH/g, more preferably ≤15 mgKOH/g, even more preferably ≤5 mgKOH/g and especially 0 mgKOH/g of vinyl polymer.

An advantage of controlled radical polymerisation via RAFT mechanism in for example a solution is that this polymerisation method avoids the undesirable homopolymerisation of monomers with a high water solubility and provides the possibility to fully control the polymer chain composition and the chain architecture of waterborne polymers. By making for example a vinyl oligomer in the form of an [A][B] type of block copolymer, followed by preparing a vinyl polymer [P], waterborne binder materials can be obtained for coatings with desirable permanent and or non-leaching, antistatic, antibleeding or antimicrobial properties.

The vinyl oligomer made by the process according to the invention may be a homopolymer, a block copolymer, a copolymer with a gradient composition, a random copolymer, a graft copolymer, a branched or a hyperbranched copolymer.

A vinyl oligomer or vinyl polymer with a gradient composition is understood to be a vinyl oligomer or vinyl polymer having a continuously changing monomer composition along the chain. The general preparation of polymers having a gradient composition is well known in the art and is described in for example WO 2006/066971.

The vinyl oligomer and vinyl polymer may be block copolymers. A block copolymer is understood to be a copolymer comprising at least two successive sections of blocks of monomer units of different chemical constitutions. The block copolymers of the invention can therefore be diblock, triblock or multiblock copolymers. Block copolymers may be linear, branched, star or comb like, and have structures like [A][B], [A][B][A], [A][B][C], [A][B][A][B], [A][B][C][B] etc. Preferably the block copolymer is a linear diblock copolymer of structure [A][B], or a linear triblock copolymer of structure [A][B][A]. Block copolymers may have multiple blocks [A], [B] and optionally [C] in which case the block copolymer is represented as for example $[A]_x[B]_y$ or $[A]_x[B]_y[C]_z$, where x, y and z are the degrees of polymerisation (DP) of the corresponding blocks [A], [B] or [C].

Furthermore any of the blocks in the block copolymer could be either a homopolymer, meaning only one type of monomer, or a copolymer, meaning more than one type of monomer. In case of a copolymer type of block the composition could be either random or gradient like, depending on the processing conditions used. A block with a gradient composition is understood to be a block having a continuously changing monomer composition along the block.

The vinyl oligomer of the present invention, if a block copolymer, comprises at least one block [A] comprising vinyl monomers bearing quaternary ammonium ion and/or quaternisable amine functional groups.

This block [A], known as the functional block, can be a homopolymer based on a monomer bearing a quaternary ammonium ion and/or quaternisable amine functional group or a copolymer, optionally random, of such a monomer with at least one other type of monomer.

Preferably the vinyl oligomer is a block copolymer.

Whatever its precise chemical composition or architecture, the vinyl oligomer is prepared according to a controlled radical polymerisation process carried out in the presence of a control agent.

The term "controlled radical polymerisation" is to be understood as a specific radical polymerisation process, also denoted by the term of "living radical polymerisation", in which use is made of control agents, such that the vinyl oligomer chains being formed are functionalised by end groups capable of being reactivated in the form of free radicals by virtue of reversible transfer or reversible termination reactions.

Controlled radical polymerisation processes in which reversible deactivation of radicals proceeds by reversible transfer reactions include for example the process for radical polymerisation controlled by control agents, such as reversible transfer agents of the dithioester (R—S—C(=S)—R') type as described in WO 98/01478 and WO 99/35178, the process for radical polymerisation controlled by reversible transfer agents of trithiocarbonate (R—S—C(=S)—S—R') type as described in for example WO 98/58974, the process for radical polymerisation controlled by reversible transfer agents of xanthate (R—S—C(=S)—OR') type as described in WO 98/58974, WO 00/75207 and WO 01/42312, and the process for radical polymerisation controlled by reversible transfer agents of dithiocarbamate (R—S—C(=S)—$NR_1R_2$) type as described for example in WO 99/31144 and WO 99/35177.

Such controlled radical polymerisations are known in the art as reversible addition-fragmentation chain transfer (RAFT) polymerisation (WO 98/01478; Macromolecules 1998 31, 5559-5562) or macromolecular design via interchange of xanthates (MADIX) polymerisation (WO 98/58974; Macromolecular Symposia 2000 150, 23-32).

"Addition-fragmentation" is a two-step chain transfer mechanism wherein a radical addition is followed by fragmentation to generate a new radical species.

When preparing for example a vinyl oligomer with a block copolymer architecture in the presence of the control agent, the end of the growing block is provided with a specific functionality that controls the growth of the block by means of reversible free radical deactivation. The functionality at the end of the block is of such a nature that it can reactivate the growth of the block in a second and/or third stage of the polymerization process with other ethylenically unsaturated monomers providing a covalent bond between for example a first and second block [A] and [B] and with any further optional blocks.

Preferably the vinyl oligomer is obtained from a controlled radical polymerisation process employing as a control agent, a reversible transfer agent. Reversible transfer agents may be one or more compounds selected from the group consisting of dithioesters, thioethers-thiones, trithiocarbonates, dithiocarbamates, xanthates and mixtures thereof.

Preferably the vinyl oligomer is obtained from a controlled radical polymerisation process employing a control agent having a group with formula —S—C(=S)—.

Preferably the vinyl oligomer is obtained from a controlled radical polymerisation process employing a xanthate such as O-ethyl-S-(1-methoxycarbonyl)ethyl dithiocarbonate [RSC (=S)—OC2H5, where R=—CH(CH3)-C(=O)—OCH3] and/or S-(1-ethoxycarbonylethyl)O-ethyl xanthate [RSC (=S)—OC2H5, where R=—CH(CH3)-C(=O)—OCH2CH3].

For clarity, control agents for use in RAFT do not include diphenylethylene, which although it is a control agent can not be used as a RAFT control agent, i.e. for a RAFT polymerisation mechanism.

Reversible transfer agents also include symmetrical transfer agents. An example is a dibenzyltrithiocarbonate such as $C_6H_4CH_2$—S—C(=S)—S—$CH_2C_6H_4$.

Preferably the vinyl oligomer is obtained from a controlled radical polymerisation process employing xanthates and/or dibenzyltrithiocarbonate.

Control agents of the xanthate type have low transfer constants in the polymerisation of styrenes and in particular methacrylate type monomers which may result in a higher polydispersity and/or poor chain growth control of the resultant vinyl polymers and may be considered as less effective RAFT control agents, although the actual mechanism involved is similar to the reversible-addition fragmentation chain transfer (RAFT) mechanism described in WO 98/01478. Reversible transfer agents of the dithioester type like for example benzyl dithiobenzoate derivatives are generally considered as having a high transfer constant and being more effective RAFT control agents.

Transfer constants are described in WO98/01478. "Chain transfer constant" ($C_{tr}$) means the ratio of the rate constant for chain transfer ($k_{tr}$) to the rate constant for propagation ($k_p$) at zero conversion of monomer and chain transfer agent (CTA). If chain transfer occurs by addition-fragmentation, the rate constant for chain transfer ($k_{tr}$) is defined as follows:

$$k_{tr}=k_{add}\times[k_\beta/(k_{-add}+k_\beta)]$$

where $k_{add}$ is the rate constant for addition to the CTA and $k_{add}$ and $k_\beta$ are the rate constants for fragmentation in reverse and forward directions respectively.

In an embodiment of the invention the control agent preferably has a transfer constant $C_{tr}=(k_{add}/k_p)[k_\beta/(k_{-add}+k_\beta)]$ of less than 50, more preferably less than 20 and most preferably below 10.

The process for radical polymerisation controlled by for example control agents of xanthate type may be carried out in bulk, in solution, in emulsion, in dispersion or in suspension. When the vinyl oligomer is a block copolymer, the RAFT polymerisation process for obtaining block [A] is performed in solution. The RAFT polymerisation process for obtaining block [B] may be performed in solution or by emulsion polymerisation. Preferably the RAFT polymerisation process for obtaining block [B] is performed in solution. Solution polymerisation is a polymerisation process in which all the reaction components including the monomer(s), initiator and control agent are dissolved in a non-monomeric liquid solvent at the start of the reaction. By non-monomeric is meant a solvent that does not comprise monomers, in other words the solvent won't react as part of the polymerisation. Usually the solvent is also able to dissolve the vinyl polymer or copolymer that is being formed. By a solvent is meant water, organic solvents or mixtures thereof.

Preferred organic solvents include alcohols (such as ethanol, isopropanol, n-butanol, n-propanol, cyclohexanol), esters (such as ethyl acetate, propyl acetate, isopropyl acetate, butyl acetate), ketone solvents (such as acetone, methyl ethyl ketone, methyl isobutyl ketone), and glycols (such as butyl glycol). More preferred organic solvents include solvents selected from the group consisting of acetone, ethanol, methyl ethyl ketone, iso-propanol, ethyl acetate, butyl glycol and mixtures thereof. Preferably the solvent is a mixture of water and a suitable organic solvent like an alcohol.

Preferably the vinyl oligomer when in form of a block copolymer comprises at least a block [A] consisting of an ethylenically unsaturated monomer bearing a quaternary ammonium ion and/or quaternisable amine functional group and optionally other ethylenically unsaturated monomers; and a block [B] comprising ethylenically unsaturated monomers selected from the group consisting of acrylates, methacrylates or vinyl monomers; and optionally a third block or more.

Preferably the vinyl oligomer when in the form of a block copolymer comprises at least blocks $[A]_x[B]_y$, where at least block [A] is obtained by a controlled radical polymerisation of at least one ethylenically unsaturated monomer via a reversible addition-fragmentation chain transfer (RAFT) mechanism in solution in the presence of a control agent and a source of free radicals; and wherein the block copolymer comprises:

5 to 90 wt % of block [A] comprising:
i) 10 to 100 mol %, preferably 20 to 100 mol %, more preferably 25 to 85 mol %, even more preferably 35 to 70 mol % and most preferably 40 to 60 mol % of ethylenically unsaturated monomers bearing quaternary ammonium ion and/or quaternisable amine functional groups;
ii) 0 to 90 mol %, preferably 15 to 75 mol %, more preferably 30 to 65 mol % and most preferably 40 to 60 mol % of ethylenically unsaturated monomers bearing water-dispersing or potentially water-dispersing functional groups;
iii) 0 to 50 mol %, preferably 0 to 30 mol %, more preferably 0 to 20 mol % and most preferably 0 to 10 mol % of $C_1$ to $C_{18}$ alkyl (meth)acrylates and/or styrenic monomers;
iv) 0 to 10 mol %, preferably 0 to 7 mol % and most preferably 0 to 5 mol % of ethylenically unsaturated monomers different from those from i), ii) and iii);

where i), ii), iii) and iv) add up to 100 mol %, and
10 to 85 wt % of block [B] comprising
i) 0 to 10 mol %, preferably 0 to 7 mol %, more preferably 0 to 4 mol % and most preferably 0 to 2 mol % of ethylenically unsaturated monomers bearing quaternary ammonium ion and/or quaternisable amine functional groups;
ii) 0 to 5 mol %, preferably 0 to 3 mol % and most preferably 0 mol % of ethylenically unsaturated monomers bearing water-dispersing or potentially water-dispersing functional groups;
iii) 50 to 100 mol %, preferably 65 to 100 mol % and most preferably 80 to 100 mol % of $C_1$ to $C_{18}$ alkyl (meth) acrylates and/or styrenic monomers;
iv) 0 to 50 mol %, preferably 0 to 35 mol % and most preferably 0 to 20 mol % of ethylenically unsaturated monomers different from those from i), ii) and iii);

where i), ii), iii) and iv) add up to 100 mol %;
where [A] has an average degree of polymerisation x, where x is an integer in the range of from 3 to 80;
where [B] has an average degree of polymerisation y, where y is an integer≥3.

Preferably the vinyl oligomer if a copolymer with a composition gradient comprises:
i) 5 to 80 mol %, preferably 7 to 50 mol % and most preferably 10 to 35 mol % of ethylenically unsaturated monomers bearing quaternary ammonium ion and/or quaternisable amine functional groups;

ii) 0 to 60 mol %, preferably 0 to 40 mol % and most preferably 0 to 25 mol % of ethylenically unsaturated monomers bearing water-dispersing or potentially water-dispersing functional groups;

iii) 20 to 95 mol %, preferably 40 to 80 mol % and most preferably 50 to 75 mol % of $C_1$ to $C_{18}$ alkyl (meth)acrylates and/or styrenic monomers;

iv) 0 to 75 mol %, preferably 0 to 50 mol % and most preferably 0 to 35 mol % of ethylenically unsaturated monomers different from those from i), ii) and iii);

where i), ii), iii) and iv) add up to 100 wt %.

The vinyl polymer is obtained by the radical emulsion polymerisation of vinyl monomers in the presence of the vinyl oligomer and preferably comprises:

i) 0 to 5 wt % and more preferably 0 wt % of ethylenically unsaturated monomers bearing quaternary ammonium ion and/or quaternisable amine functional groups;

ii) 0 to 5 wt %, preferably 0 to 3 wt %, more preferably ≤0.5 wt % and most preferably 0 wt % of ethylenically unsaturated monomers bearing water-dispersing or potentially water-dispersing functional groups;

iii) 40 to 100 wt %, preferably 70 to 100 wt % and most preferably 90 to 100 wt % of $C_1$ to $C_{18}$ alkyl (meth)acrylates and/or styrenic monomers;

iv) 0 to 60 wt %, preferably 0 to 30 wt % and most preferably 0 to 10 wt % of ethylenically unsaturated monomers different from those from i), ii) and iii);

where i), ii), iii) and iv) add up to 100 wt %.

According to another embodiment of the invention there is further provided an aqueous emulsion comprising a vinyl oligomer in the form of a block copolymer and a vinyl polymer [P]; wherein the block copolymer comprises at least blocks $[A]_x[B]_y$, where at least block [A] is obtained by a controlled radical polymerisation of at least one ethylenically unsaturated monomer via a reversible addition-fragmentation chain transfer (RAFT) mechanism in solution in the presence of a control agent and a source of free radicals; and wherein the block copolymer comprises:

5 to 90 wt % of block [A] comprising:
i) 10 to 100 mol % of ethylenically unsaturated monomers bearing quaternary ammonium ion and/or quaternisable amine functional groups;
ii) 0 to 90 mol % of ethylenically unsaturated monomers bearing water-dispersing or potentially water-dispersing functional groups;
iii) 0 to 50 mol % of $C_1$ to $C_{18}$ alkyl (meth)acrylates and/or styrenic monomers;
iv) 0 to 10 mol % of ethylenically unsaturated monomers different from those from i), ii) and iii);
where i), ii), iii) and iv) add up to 100 mol %, and 10 to 85 wt % of block [B] comprising:
i) 0 to 10 mol % of ethylenically unsaturated monomers bearing quaternary ammonium ion and/or quaternisable amine functional groups;
ii) 0 to 5 mol % of ethylenically unsaturated monomers bearing water-dispersing or potentially water-dispersing functional groups;
iii) 50 to 100 mol % of $C_1$ to $C_{18}$ alkyl (meth)acrylates and/or styrenic monomers;
iv) 0 to 50 mol % of ethylenically unsaturated monomers different from those from i), ii) and iii);
where i), ii), iii) and iv) add up to 100 mol %; and wherein vinyl polymer [P] is prepared by radical emulsion polymerisation of vinyl monomers in the presence of blocks $[A]_x[B]_y$, wherein vinyl polymer [P] comprises:
i) 0 to 5 wt % of ethylenically unsaturated monomers bearing quaternary ammonium ion and/or quaternisable amine functional groups;
ii) 0 to 5 wt % of ethylenically unsaturated monomers bearing water-dispersing or potentially water-dispersing functional groups;
iii) 40 to 100 wt % of $C_1$ to $C_{18}$ alkyl (meth)acrylates and/or styrenic monomers;
iv) 0 to 60 wt % of ethylenically unsaturated monomers different from those from i), ii) and iii);
where i), ii), iii), and iv) add up to 100 wt %;
where [A] has an average degree of polymerisation x, where x is an integer in the range of from 3 to 80;
where [B] has an average degree of polymerisation y, where y is an integer≥3.

The average degree of polymerisation x (or y) is determined by the total molar amount of monomers in block [A] (or [B]) divided by the total molar amount of control (RAFT) agent.

Preferably integer x is in the range of from 4 to 70 and more preferably 5 to 60. Preferably integer y is the range of from 5 to 500, more preferably 10 to 300 and most preferably 15 to 200. Preferably the y:x ratio is in the range of from 10:90 to 90:10, more preferably in the range of from 20:80 to 80:20 and most preferably in the range of from 30:70 to 70:30. The advantage of having such y:x ratio for block [A] to block [B] is the provision of a good balance between water-dispersability, vinyl oligomer activity and the coating performance in terms of preventing leaching or having high-water sensitivity that is undesired for outdoor coatings.

Preferably the block copolymer $[A]_x[B]_y$ comprises in the range of from 2 to 50 wt %, more preferably 4 to 40 wt % and especially 5 to 35 wt % of block [A] based on the weight of blocks [A] and [B].

Preferably the aqueous emulsion according to the invention comprises in the range of from 0.5 to 65 wt %, more preferably 1 to 60 wt %, even more preferably 2 to 55 wt %, especially 3 to 50 wt % and most preferably 4 to 45 wt % of blocks $[A]_x[B]_y$ together, based on the weight of blocks $[A]_x[B]_y$ and vinyl polymer [P].

The wt % of the vinyl oligomer, preferably having a block copolymer $[A]_x[B]_y$ architecture, based on the total amount of vinyl oligomer and vinyl polymer is preferably within the specified boundaries to maintain optimal balance between desired level of activity of the block copolymer within the coating (in terms of sufficient degree of anti-microbial, anti-static, anti-bleed performance); and a good overall coating performance properties provided by vinyl polymer [P] (in terms of e.g. film formation and mechanical properties). When the amount of block copolymer is higher than 65 wt %, the coating become more water-sensitive and might show reduced mechanical properties.

Preferably the number average molecular weight Mn of block [A] is in the range of from 200 to 40,000 g/mol, more preferably from 500 to 20,000 g/mol and most preferably from 700 to 10,000 g/mol. The advantage of having a Mn for block [A] within the specified boundaries is to maintain a good balance between low water-sensitivity of the final coating (which increases when Mn is higher than 40,000 g/mol) and good water-dispersability of the block copolymer (which is poor when Mn is lower than 200 g/mol).

Preferably the number average molecular weight Mn of block [B] is in range of from 200 to 40,000 g/mol, more preferably from 500 to 20,000 g/mol and most preferably from 700 to 10,000 g/mol. The advantage of having a Mn for block [B] within the specified boundaries is to maintain a good water-dispersability of the block copolymer; when Mn is higher than 40,000 g/mol the block copolymer cannot be dispersed properly and when Mn is lower than 200 g/mol the block copolymer is too water-soluble, which can give issues regarding leaching (in the case of non-complete grafting of the oligomer to the polymer) and/or water-sensitivity of the coating.

Preferably the ratio of Mn value for block [A] to that of block [B] is in the range of from 10:90 to 90:10, more preferably in the range of from 20:80 to 80:20 and most preferably in the range of from 30:70 to 70:30. The advantage of having such ratio of Mn for block [A] to block [B] is the provision of a good balance between water-dispersability, vinyl oligomer activity and the coating performance in terms of preventing leaching or having high-water sensitivity that is undesired for outdoor coatings.

Preferably the Tg of block [A] is −50° C. to 120° C., more preferably −20° C. to 80° C. and most preferably 0° C. to 60° C. The advantage of having a Tg of block [A] within the specified boundaries is to maintain a good water-dispersability of the block copolymer.

Preferably the Tg of block [B] is ≤50° C., more preferably ≤25° C. and most preferably ≤0° C. The advantage of having a Tg of block [B] within the specified boundaries is that a lower Tg can promote the dispersability and flexibility of the block copolymer.

The vinyl oligomer and the vinyl polymer are derived from free-radically polymerisable ethylenically unsaturated monomers, which are also usually referred to as vinyl monomers, and can contain polymerised units of a wide range of such vinyl monomers, especially those commonly used to make binders for the coatings industry.

Examples of component i) include vinyl monomers that provide the quaternary ammonium ion and/or quaternisable amine functional group in the vinyl oligomer.

Suitable vinyl monomers having a quaternary ammonium ion functionality include but are not limited to 2-trimethylammoniumethyl (meth)acrylate chloride, 2-dimethylaminoethyl (meth)acrylate methyl bromide, 2-dimethylaminoethyl (meth)acrylate methyl iodide, 2-dimethylaminoethyl (meth)acrylate dimethyl sulphate, 3-(meth)acrylamidopropyl trimethylammonium chloride ((M)APTAC), vinylbenzyl trimethylammonium chloride, diallyldimethylammonium chloride, and polymerisable quaternary ammonium ion functional monomers comprising a quaternary ammonium ion group and an anion of an ethylenically unsaturated acid, such as for example C12 n-alkyl dimethyl ethylbenzyl ammonium salt of an unsaturated sulfonic acid. Other suitable vinyl monomers having a quaternary ammonium ion functionality include amphoteric monomers such as N-vinylimidazolium sulfonate inner salts and N,N-dimethyl-N-(3-methacrylamidopropyl)-N-(3-sulfopropyl) ammonium betaine.

Suitable vinyl monomers having a quaternisable amine functionality include but are not limited to 2-dimethylaminoethyl (meth)acrylate (DMAE(M)A), 2-aminoethyl (meth)acrylate, 2-diethylaminoethyl (meth)acrylate, 3-dimethylaminopropyl (meth)acrylate, 3-dimethylamino-2,2-dimethylpropyl(meth)acrylate, N-t-butylaminoethyl (meth)acrylate, dimethylaminoneopentyl acylate, N-(meth)acryloyl sarcosine methyl ester, 2-N-morpholinoethyl (meth)acrylate, 2-N-piperidinoethyl (meth)acrylate, 3-dimethylaminopropyl (meth)acrylamide, 2-dimethylaminoethyl (meth)acrylamide, 2-diethylaminoethyl (meth)acrylamide, oxazolidinylethyl (meth)acrylate, N,N-dimethylvinyl benzylamine, p-aminostyrene, N,N-cyclohexylallylamine, allylamine, diallylamine, dimethylallylamine, N-ethyldimethylallylamine, crotyl amines and N-ethylmethallylamine.

Other suitable vinyl monomers having a quaternisable amine functionality include monomers having a pyridine functionality, which includes 2-vinylpyridine and 4-vinylpyridine; monomers having piperidine functionality, such as vinylpiperidines; and monomers having imidazole functionality, such as vinyl imidazole and N-(4-morpholinoethyl) (meth)acrylamidevinylimidazole.

The amine functional monomers can be quaternised with $C_1$-$C_{18}$ alkyl halides such as for example methyl chloride, methyl bromide, methyl iodide, dimethyl sulphate, dodecyl bromide, hexadecyl bromide, or with suitable acids such as for example hydrochloric acid or formic acid.

Preferably the vinyl oligomer if a block copolymer comprises at least one block comprising functional vinyl monomers that may become quaternised upon addition of acid, such as dimethylaminoethyl (meth)acrylate, dimethylaminopropyl (meth)acrylate, and dimethylaminopropyl (meth)acrylamide and/or comprises vinyl monomers that are permanently quaternised such as 2-trimethylammoniumethyl (meth)acrylate chloride or (M)APTAC.

The use of permanently quaternised monomers such as 2-trimethylammoniumethyl (meth)acrylate chloride (ADAMQUAT) or 3-(meth)acrylamidopropyl trimethylammonium chloride ((M)APTAC) is preferred over the use of amine based monomers such as 2-dimethylaminoethyl (meth)acrylate DMAE(M)A, as protonated DMAE(M)A groups are not permanent cationics and can decompose over time into the amine (DMAE(M)A) and the corresponding acid.

Preferably the vinyl oligomer comprises in the range of from 2 to 100 mol %, preferably 5 to 70 mol % and most preferably 10 to 50 mol % of quaternary ammonium ion functional monomer i) based on the total amount of the monomers in the vinyl oligomer. The advantage of having an amount of quaternary ammonium ion functional monomer i) as specified above is a better balance between performance level and cost/water-sensitivity. A reduced molar amount of such monomer is preferred from cost point of view and gives less issues with water-sensitivity and/or leaching, while the desired level of performance can be maintained.

Preferably the vinyl oligomer polymer comprises ≤25 mol %, more preferably ≤10 mol % and most preferably ≤5 mol % of at least a quaternary ammonium ion functional monomer based on the total amount of the monomers in the vinyl oligomer polymer.

Examples of component ii) include ethylenically unsaturated monomer units bearing nonionic, ionic or potentially ionic water-dispersing groups. Ionic groups need to be in their dissociated (i.e. salt) form to effect their water-dispersing action. If they are not dissociated they are considered as potential ionic groups which become ionic upon dissociation. Ionic water-dispersing groups include anionic water-dispersing groups such as acid groups, for example phosphoric acid groups, sulphonic acid groups, and carboxylic acid groups. For the purpose of this invention, monomers bearing cationic groups such as quaternary ammonium ion and/or quaternisable amine functional groups present in the vinyl oligomer that may also function as water-dispersing groups, herein are considered as monomers belonging to component i).

Preferred ethylenically unsaturated monomer units bearing ionic or potentially ionic water-dispersing functional groups include (meth)acrylic acid, itaconic acid, maleic acid, β-carboxyethyl acrylate, monoalkyl maleates (for example monomethyl maleate and monoethyl maleate), citraconic acid, styrenesulphonic acid, vinylbenzylsulphonic acid, vinylsulphonic acid, acryloyloxyalkyl sulphonic acids (for example acryloyloxymethyl sulphonic acid), 2-acrylamido-2-alkylalkane sulphonic acids (for example 2-acrylamido-2-methylpropanesulphonic acid (AMPS)), 2-methacrylamido-2-alkylalkane sulphonic acids (for example 2-methacrylamido-2-methylethanesulphonic acid), mono (acryloyloxyalkyl)phosphates (for example, mono(acryloyloxyethyl)phosphate and mono(3-acryloyloxypropyl)phosphates) and mono(methacryloyloxyalkyl)phosphates, and/or mixtures thereof.

Ethylenically unsaturated monomer units bearing water-dispersing or potentially water-dispersing functional groups may also include ethylenically unsaturated monomer units bearing non-ionic water-dispersing groups such as pendant polyoxyalkylene groups, more preferably polyoxyethylene groups such as methoxy(polyethyleneoxide (meth)acrylate), hydroxy polyethylene glycol (meth)acrylates, alkoxy polypropylene glycol (meth)acrylates and hydroxy polypropylene glycol (meth)acrylates, preferably having a number average molecular weight Mw of from 350 to 3000 g/mol. Examples of such ethylenically unsaturated monomers which are commercially available include w-methoxypolyethylene glycol (meth)acrylate. Another vinyl monomer which is considered as being water-dispersing is acrylamide.

Preferably ethylenically unsaturated monomer units bearing water-dispersing or potentially water-dispersing functional groups are selected from the group consisting of potentially ionic water-dispersing functional groups (such as acrylic acid (AA) and/or 2-acrylamido-2-methylpropanesulphonic acid (AMPS) in a non-ionised form) and non-ionic water-dispersing groups. Anionic water-dispersing functional groups (such as AA and AMPS in ionized form) may give complexation with the cationic functional groups of component i) and therefore may lead to stability issues.

Preferably component ii) is selected from acrylic acid (AA) and/or 2-acrylamido-2-methylpropanesulphonic acid (AMPS), provided they are non-neutralised (in a non-ionised form).

For the purpose of this invention, monomers bearing hydroxyl functionality such as hydroxyalkyl (meth)acrylates (particularly hydroxyethyl (meth)acrylate (HE(M)A)) that may also function as nonionic water-dispersing functional groups, herein are considered as monomers belonging to component iv).

For the purpose of this invention, monomers which may also provide some crosslinking properties such as (meth) acrylic acid, herein are considered as monomers providing water-dispersing functional groups, i.e. component ii).

Preferably 0 to 16 mol % of ethylenically unsaturated monomer units bearing non-ionic water-dispersing groups is used, more preferably 0 to 10 mol % and most preferred 0 to 7 mol % based on the vinyl oligomer.

Preferably block [B] of the vinyl oligomer, if a block copolymer, comprises 1 to 5 mol % of component ii).

Examples of component iii) vinyl monomers of $C_1$ to $C_{18}$ alkyl (meth)acrylates and/or styrenic monomers which may be used to form the vinyl oligomer and the vinyl polymer include but are not limited to styrenic monomers such as styrene, α-methyl styrene, t-butyl styrene, chloromethyl styrene, vinyl toluene; and esters of acrylic acid and methacrylic acid of formula $CH_2=CR^5-COOR^4$ wherein $R^5$ is H or methyl and $R^4$ is optionally substituted $C_1$ to $C_{18}$ alkyl, cycloalkyl, aryl or (alkyl)aryl which are also known as acrylic monomers, examples of which are methyl (meth)acrylate, ethyl (meth)acrylate, propyl (meth)acrylate (all isomers), butyl (meth)acrylate (all isomers), 2-ethylhexyl (meth)acrylate, isodecyl (meth)acrylate, lauryl (meth)acrylate, tridecyl (meth)acrylate, isobornyl (meth)acrylate, dicyclopentenyloxymethyl (meth)acrylate, benzyl (meth)acrylate, 2-phenoxyethyl (meth)acrylate, 3,3,5-trimethyl-cyclohexyl (meth) acrylate, p-methylphenyl (meth)acrylate, 1-naphtyl (meth) acrylate, 3-phenyl-n-propyl (meth)acrylate; and hydrophobic acrylic monomers such as side-chain crystallisable monomers, examples of which are tetradecyl (meth)acrylate, hexadecyl (meth)acrylate, octadecyl (meth)acrylate (=stearyl (meth)acrylate); and mixtures thereof. Preferably, the monomers are selected from styrene, isobornyl (meth)acrylate and the group of $C_1$ to $C_{12}$, more preferably $C_1$ to $C_8$ alkyl (meth) acrylate monomers including methyl (meth)acrylate, ethyl (meth)acrylate, propyl (meth)acrylate (all isomers), butyl (meth)acrylate (all isomers) and 2-ethylhexyl (meth)acrylate.

Examples of component iv) include dienes such as 1,3-butadiene and isoprene; divinyl benzene; vinyl monomers such as acrylonitrile, methacrylonitrile; vinyl halides such as vinyl chloride; vinylidene halides such as vinylidene chloride; vinyl esters such as vinyl acetate, vinyl propionate, vinyl laurate; vinyl esters of versatic acid such as VEOVA™ 9 and VEOVA™ 10 (VEOVA™ is a trademark of Resolution); heterocyclic vinyl compounds; alkyl esters of mono-olefinically unsaturated dicarboxylic acids such as di-n-butyl maleate and di-n-butyl fumarate; amides of unsaturated carboxylic acids such as N-methylol(meth)acrylamide and N-alkyl (meth)acrylamides.

Examples of component iv) may also include vinyl monomers having crosslinking functional groups such as hydroxyl, silane, epoxy, acetoacetoxy, unsaturated fatty acid, (meth) acryloyl, (meth)allyl, keto and or aldehyde functional groups, examples of which include acetoacetoxyethyl methacrylate, vinyl alkyl ketones of 4 to 7 carbon atoms such as vinyl methyl ketone, diacetone (meth)acrylate, diacetone acrylamide, (meth)acroleine, glycidyl (meth)acrylate, hydroxyalkyl (meth)acrylates such as hydroxyethyl (meth)acrylate (HE(M)A), 2-hydroxypropyl (meth)acrylate, 4-hydroxybutyl (meth)acrylate and their modified analogues like Tone M-100 (Tone is a trademark of Union Carbide Corporation), and/or mixtures thereof.

Examples of component iv) vinyl monomers also include vinyl monomers having (wet) adhesion promoting functional groups such as ureido functional monomers like N-(2-methacryloyloxyethyl)ethylene urea (Plex 6852-O available from Degussa) or N-(2-methacrylamidoethyl)ethylene urea (Sipomer WAM II available from Rhodia).

Preferably the vinyl oligomer, optionally in the form of a block copolymer, is prepared according a solution dispersion polymerisation process, which comprises the preparation of the vinyl oligomer in solution using a RAFT radical polymerisation process and the dispersion of the obtained vinyl oligomer in water. Dispersion of the vinyl oligomer in water can be performed by adding water to the vinyl oligomer solution or by adding the vinyl oligomer solution to water. Optionally suitable surfactants can be used to aid in the dispersion process. The vinyl oligomer preferably comprises a minimal amount of water-dispersing groups needed to render the vinyl oligomer self-dispersible in water. After the vinyl oligomer is dispersed in water the remaining solvent can optionally be removed for example under reduced pressure.

Preferably the solvent applied for the vinyl oligomer preparation using the solution dispersion polymerisation process comprises an organic solvent with a low boiling point and or a high evaporation rate to allow fast removal of the organic solvent after the dispersion step under reduced pressure. Examples of such solvents include acetone, ethanol, isopropanol, methyl ethyl ketone and ethyl acetate.

If the vinyl oligomer is a block copolymer comprising at least blocks [A] and [B], blocks [A] and [B] can be prepared in any order.

Furthermore after preparation of a first block, the prepared block can be purified from residual monomers and subsequently used for the polymerisation a second monomer composition as a second block or the second monomer composition can be polymerised directly after the preparation of first block is completed. In this case at least 80 wt %, preferably at least 90 wt % and most preferably at least 95 wt % of the first block monomer composition is reacted before the second monomer composition is reacted. The second block can contain up to 20 wt % (preferably 10 wt % or less) of the first monomer composition.

In a special embodiment related to aqueous emulsions of the present invention, the vinyl oligomer may be made sufficiently hydrophobic by adjusting the block lengths and optionally the composition so that the vinyl oligomer is substantially insoluble, more preferably totally insoluble in water and the vinyl oligomer itself may then be used for example to provide antimicrobial properties without the presence of the vinyl polymer. By substantially insoluble vinyl oligomer herein is defined a vinyl oligomer that is less than 50 wt %, more preferably less than 30 wt % soluble in water at 23±2° C. throughout a pH range of 2 to 10. The solubility can be determined by centrifugation of a sample of aqueous emulsion according to the invention diluted with water to 10% solids, at a pH where the vinyl oligomer is expected to be most soluble, for 5 hours in a Sigma 3K30 centrifuge at a centrifugal force of 40,000 g (21,000 rpm), after which the supernatant should be separated and evaporated for 1 hour at 105° C. to determine the solids content of the supernatant.

The solubility percentage can be calculated by dividing the amount of solids (in gram) of the supernatant by the total amount of solids put initially in the centrifuge multiplied by 100.

In another embodiment of the invention there is provided an aqueous emulsion comprising an insoluble or substantially insoluble vinyl oligomer in the form of a block copolymer comprising at least blocks $[A]_x[B]_y$, where at least block [A] is obtained by a controlled radical polymerisation of at least one ethylenically unsaturated monomer via a reversible addition-fragmentation chain transfer (RAFT) mechanism in solution in the presence of a control agent and a source of free radicals; and wherein the block copolymer comprises:
5 to 90 wt % of block [A] comprising:
  i) 10 to 100 mol % of ethylenically unsaturated monomers bearing quaternary ammonium ion and/or quaternisable amine functional groups;
  ii) 0 to 90 mol % of ethylenically unsaturated monomers bearing water-dispersing or potentially water-dispersing functional groups;
  iii) 0 to 50 mol % of $C_1$ to $C_{18}$ alkyl (meth)acrylates and/or styrenic monomers;
  iv) 0 to 10 mol % of ethylenically unsaturated monomers different from those from i), ii) and iii);
where i), ii), iii) and iv) add up to 100 mol %, and
10 to 85 wt % of block [B] comprising:
  i) 0 to 10 mol % of ethylenically unsaturated monomers bearing quaternary ammonium ion and/or quaternisable amine functional groups;
  ii) 0 to 5 mol % of ethylenically unsaturated monomers bearing water-dispersing or potentially water-dispersing functional groups;
  iii) 50 to 100 mol % of $C_1$ to $C_{18}$ alkyl (meth)acrylates and/or styrenic monomers;
  iv) 0 to 50 mol % of ethylenically unsaturated monomers different from those from i), ii) and iii);
where i), ii), iii) and iv) add up to 100 mol %; and
where [A] has an average degree of polymerisation x, where x is an integer in the range of from 3 to 80;
where [B] has an average degree of polymerisation y, where y is an integer≥3.

A process for preparing a vinyl oligomer having a gradient composition comprises continually introducing a first monomer feed to a reactor, where the first monomer feed continually varies in its compositional feed content during the continuous introduction by the addition of a different second monomer feed to the first monomer feed and polymerising the monomers introduced into the reactor.

The addition of the second monomer feed to the first monomer feed may be in parallel to the introduction of the first monomer feed to the polymerisation (i.e. both feeds start and end at the same time). Alternatively the start of monomer feed one to the reactor may precede the start of the addition of the second monomer feed to the first monomer feed, or both monomer feeds may be started simultaneously but the time taken for the addition of the second monomer feed to the first monomer feed may exceed the time taken for the introduction of the first monomer feed to the reactor.

A vinyl oligomer having a gradient composition may also be obtained by the simultaneous introduction of a first and a second monomer feed into the reactor where the rate of the introduction of the first monomer feeds varies with respect to the rate of the introduction of the second monomer feed.

The at least two monomer feeds used to prepare the vinyl oligomer having a gradient composition usually differ in composition. The difference between the at least two monomer feeds may be for example a difference in quaternary ammonium ion or quaternisable amine functional monomer composition, a difference in glass transition temperature (Tg), or simply a variation in the concentration of the respective monomers in each monomer feed.

Vinyl polymer [P] is prepared using a radical emulsion polymerisation process in the presence of the vinyl oligomer (optionally in the form of block copolymer $[A]_x[B]_y$), where optionally the control agent functional group located at one of the chain ends of the prepared vinyl oligomer or block copolymer $[A]_x[B]_y$ can be deactivated or removed prior to the preparation of vinyl polymer [P]. The control agent may optionally be removed before or after dispersion of the vinyl oligomer or block copolymer and before or after the vinyl polymer preparation. Preferably the control agent is removed before dispersion of the vinyl oligomer or block copolymer. When a RAFT agent is used as control agent the RAFT group can be deactivated or removed via for example oxidation reactions, radical induced reactions, hydrolysis, or aminolysis. In the case that the control agent functional group is not removed or only partially removed prior to the preparation of vinyl polymer [P] at least part of the vinyl polymer [P] chains will grow onto or become covalently attached to at least part of the vinyl oligomer or block copolymer chains.

Preferably the chain end functionality of the vinyl oligomer, which may be a block copolymer $[A]_x[B]_y$, is retained to assist with the covalent bond formation between the vinyl oligomer and any further optional blocks and/or vinyl polymer [P].

The chain end functionality of the vinyl oligomer may be a RAFT group (—S—C(=S)—) or a thiol (—SH) group or any other group derived from the RAFT control agent that can provide covalent bond formation between the vinyl oligomer and vinyl polymer [P].

Therefore the control agent may optionally be removed before or after dispersion of the vinyl oligomer or block copolymer and before or after the vinyl polymer preparation. Preferably the control agent is removed before dispersion of the vinyl oligomer or block copolymer.

Vinyl polymer [P] is preferably prepared using a radical emulsion polymerisation process in the presence of the vinyl oligomer or block copolymer $[A]_x[B]_y$ where the vinyl polymer [P] is preferably grown from or grafted onto the vinyl oligomer or block copolymer. Preferably at least 20 wt % of vinyl polymer [P] is covalently bound to the vinyl oligomer or block copolymer.

The covalent bond formation between the vinyl oligomer and the vinyl polymer preferably takes place during the preparation of the vinyl polymer.

In an embodiment of the invention there is provided a process for preparing a composition according to the invention wherein said method comprises the following steps:
1. synthesis in a solvent by means of a RAFT radical polymerisation process of an vinyl oligomer;
2. optional removal of the control agent before, during or after dispersing said vinyl oligomer in water;
3. optional removal of the solvent from said vinyl oligomer;
4. dispersion of said vinyl oligomer in water optionally containing monomers, by adding either water to the vinyl oligomer or adding the vinyl oligomer to water, optionally using surfactants;
5. optional removal of solvent from the vinyl oligomer dispersion (if solvent is still present from step 4.);
6. performing an emulsion polymerisation process of monomers in the presence of the vinyl oligomer dispersion prepared in step 4 and or step 5 to obtain vinyl polymer [P].

The vinyl oligomer prepared by the above process is preferably a block copolymer $[A]_x[B]_y$.

In another embodiment of the invention there is provided a process for preparing a composition according to the invention where the oligomer is a block copolymer $[A]_x[B]_y$ wherein said method comprises the following steps:
1. synthesis in a solvent by means of a RAFT radical polymerisation process of a first block [A] followed by the polymerisation of at least a second block [B]. The order of preparation of [A] and [B] can also be reversed;
2. optional removal of the control agent before, during or after dispersing the block copolymer $[A]_x[B]_y$ in water;
3. optional removal of the solvent from block copolymer $[A]_x[B]_y$;
4. dispersion of the block copolymer $[A]_x[B]_y$ in water optionally containing monomers, by adding either water to the block copolymer $[A]_x[B]_y$ or adding the block copolymer $[A]_x[B]_y$ to water, optionally using surfactants;
5. optional removal of solvent from the block copolymer $[A]_x[B]_y$ dispersion (if solvent is still present from step 4.);
6. performing an emulsion polymerisation process of monomers in the presence of the block copolymer $[A]_x[B]_y$ dispersion prepared in step 4 and or step 5 to obtain vinyl polymer [P].

Alternatively after step 1 the solvent is removed by a suitable method to get a solid, which solid can be afterwards dispersed into water.

Furthermore the free radical polymerisation may be carried out as a batch or as a semi-continuous polymerisation process.

In yet another embodiment there is provided a process for preparing an aqueous emulsion according to the invention, said emulsion comprising a vinyl oligomer in the form of a block copolymer and a vinyl polymer [P]; wherein the block copolymer comprises at least blocks $[A]_x[B]_y$, where at least block [A] is obtained by a controlled radical polymerisation of at least one ethylenically unsaturated monomer via a reversible addition-fragmentation chain transfer (RAFT) mechanism in solution in the presence of a control agent and a source of free radicals; and wherein the block copolymer comprises:
5 to 90 wt % of block [A] comprising:
 i) 10 to 100 mol % of ethylenically unsaturated monomers bearing quaternary ammonium ion and/or quaternisable amine functional groups;
 ii) 0 to 90 mol % of ethylenically unsaturated monomers bearing water-dispersing or potentially water-dispersing functional groups;
 iii) 0 to 50 mol % of $C_1$ to $C_{18}$ alkyl (meth)acrylates and/or styrenic monomers;
 iv) 0 to 10 mol % of ethylenically unsaturated monomers different from those from i), ii) and iii);
where i), ii), iii) and iv) add up to 100 mol %, and
10 to 85 wt % of block [B] comprising:
 i) 0 to 10 mol % of ethylenically unsaturated monomers bearing quaternary ammonium ion and/or quaternisable amine functional groups;
 ii) 0 to 5 mol % of ethylenically unsaturated monomers bearing water-dispersing or potentially water-dispersing functional groups;
 iii) 50 to 100 mol % of $C_1$ to $C_{18}$ alkyl (meth)acrylates and/or styrenic monomers;
 iv) 0 to 50 mol % of ethylenically unsaturated monomers different from those from i), ii) and iii);
where i), ii), iii) and iv) add up to 100 mol %; and
wherein vinyl polymer [P] is prepared by radical emulsion polymerisation of vinyl monomers in the presence of blocks $[A]_x[B]_y$ wherein vinyl polymer [P] comprises:
 i) 0 to 5 wt % of ethylenically unsaturated monomers bearing quaternary ammonium ion and/or quaternisable amine functional groups;
 ii) 0 to 5 wt % of ethylenically unsaturated monomers bearing water-dispersing or potentially water-dispersing functional groups;
 iii) 40 to 100 wt % of $C_1$ to $C_{18}$ alkyl (meth)acrylates and/or styrenic monomers;
 iv) 0 to 60 wt % of ethylenically unsaturated monomers different from those from i), ii) and iii);
where i), ii), iii), and iv) add up to 100 wt %;
where [A] has an average degree of polymerisation x, where x is an integer in the range of from 3 to 80;
where [B] has an average degree of polymerisation y, where y is an integer≥3.

Preferably the free-radical polymerisation is effected by heating the reactor contents to a temperature in the range of from 30 to 100° C. and more preferably in the range of from 30 to 90° C.

A free-radical polymerisation of ethylenically unsaturated monomers to make either the vinyl oligomer and/or the vinyl polymer will require the use of a source of free radicals (i.e. an initiator) to initiate the polymerisation. Suitable free-radical-yielding initiators include inorganic peroxides such as potassium, sodium or ammonium persulphate, hydrogen peroxide, or percarbonates; organic peroxides, such as acyl peroxides including e.g. benzoyl peroxide, alkyl hydroperoxides such as t-butyl hydroperoxide and cumene hydroperoxide; dialkyl peroxides such as di-t-butyl peroxide; peroxy esters such as t-butyl perbenzoate and the like; mixtures may also be used. The peroxy compounds are in some cases advantageously used in combination with suitable reducing agents (redox systems) such as potassium or sodium pyrosulphite or bisulphite, and iso-ascorbic acid. Metal compounds such as Fe.EDTA (EDTA is ethylene diamine tetracetic acid) may also be usefully employed as part of the redox initiator system. Azo functional initiators may also be used. Preferred azo initiators include 2,2'-azobis(isobutyronitrile) (AIBN), 2,2'-azobis(2-methyl-butyronitrile) (AMBN), 2,2'-azobis(2-methylpropionamidine) dihydrochloride and 4,4'-azobis(4-cyanovaleric acid). It is possible to use an initiator partitioning between the aqueous and organic phases, e.g. a combination of t-butyl hydroperoxide, iso-ascorbic acid and Fe.EDTA. Preferred initiators for the vinyl oligomer preparation include azo functional initiators such as for example AMBN and 4,4'-azobis(4-cyanovaleric acid) and 2,2'-azobis(2-methylpropionamidine) dihydrochloride. Preferred initiators for the vinyl polymer preparation include azo functional initiators such as AMBN, 4,4'-azobis(4-cyanovaleric acid) and 2,2'-azobis(2-methylpropionamidine) dihydrochloride, and alkyl hydroperoxides such as t-butyl hydroperoxide, preferably combined with a reducing agent such as iso-ascorbic acid. The amount of initiator or initiator system to use is conventional, e.g. within the range 0.05 to 6 wt % based on the total vinyl monomer(s) used. A further amount of initiator may optionally be added at the end of the polymerisation process to assist the removal of any residual vinyl monomers.

A chain transfer agent may be added to control the molecular weight of the vinyl oligomer and/or vinyl polymer. Suitable chain transfer agents include mercaptans such as n-dodecylmercaptan, n-octylmercaptan, t-dodecylmercaptan, mercaptoethanol, iso-octyl thioglycolurate, $C_2$ to $C_8$ mercapto carboxylic acids and esters thereof such as 3-mercaptopropionic acid and 2-mercaptopropionic acid; and halogenated hydrocarbons such as carbon tetrabromide and bromotrichloromethane. Preferably no chain transfer agent is added during the preparation of the vinyl oligomer.

Surfactants can be utilised in order to assist in the dispersion of the emulsification of the vinyl oligomer polymer in water (even if self-dispersible). Suitable surfactants include but are not limited to conventional anionic, cationic and/or nonionic surfactants and mixtures thereof such as Na, K and $NH_4$ salts of dialkylsulphosuccinates, Na, K and $NH_4$ salts of sulphated oils, Na, K and $NH_4$ salts of alkyl sulphonic acids, Na, K and $NH_4$ alkyl sulphates, alkali metal salts of sulphonic acids; fatty alcohols, ethoxylated fatty acids and/or fatty amides, and Na, K and $NH_4$ salts of fatty acids such as Na stearate and Na oleate. Other anionic surfactants include alkyl or (alk)aryl groups linked to sulphonic acid groups, sulphuric acid half ester groups (linked in turn to polyglycol ether groups), phosphonic acid groups, phosphoric acid analogues and phosphates or carboxylic acid groups. Cationic surfactants include alkyl or (alk)aryl groups linked to quaternary ammonium salt groups. Nonionic surfactants include polyglycol ether compounds and preferably polyethylene oxide compounds as disclosed in "nonionic surfactants—Physical chemistry" edited by M. J. Schick, M. Decker 1987.

Optionally the emulsifier can be added either at the beginning of polymerisation or as a post-stabiliser, at a level of 0.5 to 5 wt %. Preferably a cationic or nonionic surfactant is used, most preferably a nonionic surfactant is used.

If desired the aqueous emulsion of the invention can be used in combination with other polymer compositions which are not according to the invention. Furthermore the composition of the invention is particularly suitable for use in coating applications in which it may provide a key part of coating compositions or formulations. Such coating compositions can be pigmented or unpigmented.

In another embodiment there is provided an aqueous emulsion according to the invention additionally comprising a polymer [Q], wherein the solids content of the vinyl oligomer polymer is ≥1 wt % and ≤35 wt % based on total solids content of vinyl oligomer polymer and polymer [Q] together. Preferably polymer [Q] is an acrylic, urethane, urethane-acrylic, alkyd, alkyd-acrylic or another type of polymer.

In a preferred embodiment there is provided a blend of an aqueous polymer [Q] dispersion comprising an acrylic, urethane, urethane-acrylic, alkyd, alkyd-acrylic or another type of polymer [Q] with the aqueous emulsion of the invention. The advantage of such blending is that the overall performance properties of the aqueous polymer dispersion (coating) are retained, and additionally the aqueous emulsion of the invention provides the coating with improved antistatic, antibleeding and/or antimicrobial properties due to the cationic functionality of the vinyl oligomer. Preferably the solids content of the aqueous emulsion of the invention added to the aqueous polymer [Q] dispersion amounts≤35 wt % on total solids content of the blend and more preferably ≤25 wt %. Preferably the solids content of the aqueous emulsion of the invention added to the aqueous polymer [Q] dispersion amounts≥1 wt % on total solids content of the blend and more preferably ≥5 wt %.

Preferably the polymer [Q] dispersion that is added to the aqueous emulsion of the invention is an aqueous acrylic polymer dispersion.

Preferably the particle size of the polymer [Q] dispersion that is blended with the aqueous emulsion of the invention is in the range of from 50 to 400 nm, preferably ≥80 nm. Preferably the particle size of the aqueous emulsion according to the invention is ≤80 nm.

It is well known that most commercial aqueous polymer dispersions are anionically stabilised. Therefore, in case of blending with an anionically stabilised polymer dispersion, the aqueous emulsion of the invention preferably contains a sufficient amount of non-ionic water-dispersing groups (either from the vinyl oligomer or from pre- or post-added non-ionic surfactant) prior to its addition to the anionically stabilised aqueous polymer dispersion to prevent destabilisation of either or both of the aqueous polymer dispersions. Optionally, the stability of the blend can be further improved by addition of an amount of 0.5 to 8 wt %, preferably 1 to 5 wt % (based on total solids) of a suitable nonionic surfactant to the anionically stabilised polymer dispersion. Preferred nonionic surfactants include non-alkyl phenol ethoxylates with a high ethylene oxide content, such as a fatty alcohol ethoxylate with more than 20 ethylene oxide units.

Furthermore, the advantage of the composition according to the invention is that the cationic functionality is strongly adsorbed or grafted to the particle surface of the vinyl oligomer polymer, which means that the final blend can be advantageously formulated with a broad range of additives commonly used for commercial anionically stabilised dispersion polymers such as anionic acrylic emulsion polymers.

Suitable organic co-solvents which may be added during the process or after the process during formulation steps are well known in the art and include for example xylene, toluene, methyl ethyl ketone, acetone, ethanol, isopropanol, ethyl acetate, butyl acetate, diethylene glycol, ethylene diglycol, butyl glycol, butyl diglycol and 1-methyl-2-pyrrolidinone.

Preferably the aqueous emulsion of the invention comprises 0 to 50 wt %, more preferably 0 to 40 wt % and most preferably 0 to 35 wt % of organic co-solvent by weight of the vinyl oligomer polymer.

The solids content of the aqueous emulsion of the invention is preferably within the range of from 20 to 60 wt %, and most preferably within the range of from 30 to 50 wt %.

The aqueous emulsion of the invention may contain conventional ingredients, some of which have been mentioned above; examples include pigments, dyes, emulsifiers, surfactants, plasticisers, thickeners, heat stabilisers, levelling agents, anti-cratering agents, fillers, sedimentation inhibitors, UV absorbers, antioxidants, drier salts, organic co-solvents, wetting agents and the like introduced at any stage of the production process or subsequently. It is possible to include an amount of antimony oxide in the emulsion to enhance the fire retardant properties.

The aqueous emulsion of the invention may be applied to a variety of substrates including wood, board, metals, stone, concrete, glass, cloth, leather, paper, plastics, foam and the like, by any conventional method including brushing, dipping, flow coating, spraying, flexo printing, gravure printing, any other graphic arts application methods and the like. The aqueous carrier medium is removed by natural drying or accelerated drying (by applying heat) to form a coating.

Accordingly, in a further embodiment of the invention there is provided a coating or a polymeric film obtained from an aqueous emulsion of the invention.

The coating may be an antimicrobial, antistatic or anti-bleeding coating.

In a preferred embodiment there is provided a coating having a permanent cationic surface obtained from an aqueous emulsion according to the invention.

EXAMPLES

The present invention is now illustrated by reference to the following examples. Unless otherwise specified, all parts, percentages and ratios are on a weight basis. The term comparative means that it is not according to the invention and is denoted with a C.

In the examples, the following abbreviations and terms are specified:

DP=degree of polymerisation
APTAC=3-acrylamidopropyl trimethylammonium chloride (APTAC) available from Aldrich as 75 wt % solution in water
ADAMQUAT=2-trimethylammoniumethyl acrylate chloride (ADAMQUAT MC-80) available from Arkema as 80 wt % solution in water
BA=butyl acrylate
MMA=methyl methacrylate
AA=acrylic acid
SLS=sodium lauryl sulfate
APS=ammonium persulfate
AIBN=2,2'-azobis(isobutyronitrile)
xanthate 1=S-(1-ethoxycarbonylethyl) O-ethyl xanthate (prepared according to the procedure described in WO 98/58974)

Molecular weights were determined by gel permeation chromatography (GPC) in hexafluoroisopropanol (HFIP) as a solvent relative to poly(methylmethacrylate) (PMMA) standards.

Vinyl Oligomer 1
Synthesis of a diblock copolymer based on APTAC and butyl acrylate with a target DP for APTAC of x=5 and for BA of y=5:

Step 1: Block [A]:

40 gram of demineralised water, 40 gram of ethanol, and 6.5 gram (29.3 mmol) of xanthate 1 were added to a 250 mL three-necked glass flask equipped with a condenser, temperature measuring probe and magnetic stirring device. The reaction mixture was degassed by purging with nitrogen at room temperature for 15 minutes while stirring. The temperature was raised to 70° C. and 0.24 gram (1.46 mmol) of AIBN was added as a slurry in 2 gram ethanol. Within 5 minutes the gradual addition was started of a mixture of 40 gram (145 mmol) APTAC (75% solution in water) and 20 gram of ethanol. The addition lasted 3 hours under nitrogen and at a controlled temperature of 70° C. At the end of the monomer feed the reaction mixture was kept for another 2 hours at 70° C. The reaction mixture was then cooled to 20° C. and a sample was withdrawn for further analysis. The conversion of APTAC as determined with ion chromatography was found to be 94%. GPC analysis of the final product resulted in the following values: Mn=5890 g/mol, PDi (=Mw/Mn)=1.37.

Step 2: Block [B]:

The reaction mixture obtained in step 1 above was heated under weak nitrogen stream to a temperature of 70° C., followed by the addition of 0.24 gram AIBN in 2 g ethanol. Within 5 minutes the gradual addition was started of 18.7 gram (146 mmol) BA. The addition lasted 3 hours under nitrogen at a controlled temperature of 70° C. At the end of the monomer feed the reaction mixture was kept for another 3 hours at 70° C., whereafter the resulting reaction mixture was cooled.

Analysis of the final reaction mixture gave a final conversion of 99.7% for APTAC (determined with ion chromatography), and 97.8% for BA (determined by gas chromatography).

After removal of the ethanol from the final reaction mixture under reduced pressure (rotary evaporation) and extra addition of demineralized water the final solids content was 40%. GPC analysis of the final $[A]_5[B]_5$ block copolymer product (vinyl oligomer 1) resulted in the following values: Mn=6500 g/mol, Mn=9000 g/mol, PDi (=Mw/Mn)=1.39.

Vinyl Oligomers 2 to 12

Further vinyl oligomers 2 to 12 were prepared using the process described above for vinyl oligomer 1. An overview of the prepared vinyl oligomers is given in Table 1. The molecular weight data (in g/mol) for the prepared vinyl oligomers as determined by GPC(HFIP as solvent, calibration on PMMA standards) were:

vinyl oligomer 4 Mn=6,800 g/mol, Mw=10,600 g/mol, PDi=1.57;
vinyl oligomer 10 Mn=5,500 g/mol, Mw=8,300 g/mol, PDi=1.52;
vinyl oligomer 11 Mn=8,500 g/mol, Mw=15,500 g/mol, PDi=1.83.

TABLE 1

| Vinyl oligomer | Monomers and monomer DP | ADAMQUAT or APTAC conversion | BA conversion | Final solids[1] |
|---|---|---|---|---|
| 1 | APTAC-BA 5-5 | 99.7% | 98% | 40 |
| 2 | APTAC-BA 10-10 | 99.6% | 99% | 40 |
| 3 | APTAC-BA 20-10 | 99.4% | 97% | 44 |
| 4 | ADAMQUAT-BA 5-5 | 97% | 64% | 62 |
| 5 | ADAMQUAT-BA 10-10 | 84% | ≈30% | 55 |
| 6 | ADAMQUAT-BA 20-10 | 80% | 33% | 41 |
| 7 | ADAMQUAT-BA 5-5 | 99.9% | 96% | 63 |
| 8 | ADAMQUAT-BA 10-10 | 99.5% | 96% | 50 |
| 9 | ADAMQUAT-BA 20-10 | 99.2% | 94% | 41 |
| 10 | ADAMQUAT-BA 5-5 | 100.0% | 96% | 62 |
| 11 | ADAMQUAT-BA 10-10 | 100.0% | 97% | 57 |
| 12 | ADAMQUAT-BA 20-10 | 99.9% | 96% | 55 |

[1]Final solids content after removal of the ethanol.

Example 1

Synthesis of a Vinyl Oligomer Polymer Based on Vinyl Oligomer 1

197.4 gram of demineralised water and 33.7 gram of the solution of vinyl oligomer 1 prepared above (40% in water) were added to a 1 L three-necked glass flask equipped with a condenser, temperature measuring probe and stirring device. The reaction mixture was heated while stirring to 80° C. under nitrogen. At 80° C. 5 wt % of a monomer mixture consisting of in total 62.6 gram BA and 72.4 gram MMA were added to the reaction mixture, followed by 5.4 gram of a 10 wt % solution of tert-butyl hydroperoxide in demineralized water. After 5 minutes of mixing at 80° C., 10 wt % of a catalyst solution consisting of in total 0.4 gram isoascorbic acid in 80.6 gram demineralized water, was added to the reaction mixture. The reaction mixture was then heated to 88° C. After 10 minutes at 88° C. the residual 95% of the monomer mixture and 90% of the catalyst solution was gradually added to the reaction mixture over a time period of 2 hours, during which the temperature was kept at 88° C. At the end of the monomer feed the reaction mixture was kept for another 30 minutes at 88° C. A post reaction with tert-butyl hydroperoxide and isoascorbic acid was performed to react any residual monomer. After pH adjustment of the latex with ammonia (from pH 2.7 to 5.1) 50 gram of a 5 wt % hydrogen peroxide solution in water was added to the mixture over a period of 1 hour at 70° C. The resultant emulsion was then cooled to room temperature. Final free monomer levels were all well below 500 ppm. The properties of the final emulsion are given in Table 2 below.

Examples 2 to 6

Vinyl oligomer polymers 2 to 6 were prepared using the vinyl oligomers as described in Table 1 using the process and monomer composition (MMA/BA, Tg 10° C.) described above for Example 1. The results are shown in Table 2. All vinyl oligomer polymers were prepared with little or no fouling and less than 0.05 volume % of sediment.

Example 7

Preparation of a Blend of a Vinyl Oligomer Polymer of Example 1 (20 Wt % on Total Blend Solids Content) with an Acrylic Emulsion Polymer (Comparative Example 2 Below)

To an amount of 20.0 gram of the anionically stabilized acrylic emulsion polymer of Comparative example 2 (particle size of 87 nm) was added 1.0 wt % (on solids) of a non-ionic surfactant, resulting in mixture A. Then, to an amount of 20.0 gram of the cationically stabilized vinyl oligomer polymer of Example 1 (particle size of 67 nm) was added 5.0 wt % (on solids) of a non-ionic surfactant, resulting in mixture B. After 10 minutes of mixing, 5.6 gram of mixture B (adjusted to pH 8 with ammonia) was added under stirring to 20 gram of mixture A. The resulting stable blend (Example 7) comprising 20 wt % of the vinyl oligomer polymer of Example 1 (on total solids content of the blend) was then tested for antistatic performance according the procedure described above.

Comparative Example 1

Comparative example 1 is an acrylic emulsion polymer prepared according to Example 1 as disclosed in EP 758364.

Comparative Example 2

Synthesis of a MMA/BA/AA (49.0/50.1/0.9 Wt Ratio) Acrylic Emulsion Polymer 240.7 gram of demineralised water and 9.5 gram of SLS (30% in water) were added to a 1 L three-necked glass flask equipped with a condenser, temperature measuring probe and stirring device. The reaction mixture was heated while stirring to 65° C. under nitrogen. At 65° C., 10 wt % of a pre-emulsified monomer feed mixture consisting of in total 131.6 gram of demineralised water, 4.8 gram of SLS (30% in water), 153.5 gram MMA, 157.2 gram BA and 2.8 gram AA were added to the reaction mixture. The reaction mixture was further heated to 75° C. and then a mixture of 0.26 gram of APS and 4.6 gram of demineralised water was added. The reaction mixture was then heated to 85° C. and kept at this temperature for 10 minutes. An initiator feed mixture of 0.60 gram APS and 59.3 gram demineralised water, and the remaining 90% of the pre-emulsified monomer feed were then gradually added as parallel feeds to the reaction mixture over a time period of 3 hours. The reaction mixture was then kept for 30 minutes at 85° C. A post reaction with tert-butyl hydroperoxide and isoascorbic acid was performed to react any residual monomer. The resultant emulsion was then cooled to room temperature. The pH of the latex was adjusted to 8.0 by addition of ammonia. Final free monomer levels were well below 500 ppm. The final solids level was 40 wt %, and the particle size as measured by DLS was 87 nm.

Comparative Example 3

Synthesis of a MMA/BA/ADAMQUAT (51.1/43.9/5.0 Wt Ratio) Emulsion Polymer 479.6 gram of demineralised water and 2.65 gram of cetyl-trimethylammonium bromide (Aldrich) were added to a 1 L three-necked glass flask equipped with a condenser, temperature measuring probe and stirring device. The reaction mixture was heated to 80° C. while stirring under nitrogen. At 80° C., 5 wt % of a monomer feed mixture consisting of in total 135.6 gram of MMA, 116.48 gram of BA and 16.6 gram of ADAMQUAT were added to the reaction mixture. After 10 minutes at 80° C. an amount of 10.5 gram of a 10% tert-butylhydroperoxide solution in water was added, followed by 10% of a mixture of 0.80 gram of isoascorbic acid and 51.1 gram of demineralised water. The reaction mixture was then heated to 88° C. and kept at this temperature for 10 minutes. The remaining 95% of the pre-emulsified monomer feed and the remaining 90% of the isoascorbic acid solution were then gradually added as parallel feeds to the reaction mixture over a time period of 2 and 2.5 hours, respectively. A post reaction with tert-butyl hydroperoxide and isoascorbic acid was then performed to react any residual monomer. The resultant emulsion was then cooled to room temperature. The pH of the latex was adjusted to 8.0 by addition of ammonia. Final free monomer levels were well below 500 ppm. The final solids level was 30 wt %, and the particle size as measured by DLS was 184 nm.

Comparative Example 4

Comparative example 4 has been prepared according the procedure for Comparative example 3, but now the ADAMQUAT monomer (16.6 gram) was replaced by the APTAC monomer (17.7 gram). Final solids level for Comparative example 4 was 30%, and the particle size as measured by DLS was 145 nm.

The properties of the final emulsions prepared according to examples 1 to 6 are given in Table 2 below.

TABLE 2

| Example | Vinyl oligomer | wt % ratio oligomer/polymer | Solids (theor.) (wt %) | Final particle size (DLS) | Mn kg/mol | Mw kg/mol | PDi (Mw/Mn) |
|---|---|---|---|---|---|---|---|
| 1 | 1 | 10/90 | 28% | 67 nm | 29.7 | 87.8 | 2.95 |
| 2 | 2 | 10/90 | 28% | 132 nm | 38.2 | 196.0 | 5.13 |
| 3 | 4 | 10/90 | 20% | 118 nm | 21.9 | 47.4 | 2.17 |
| 4 | 5 | 10/90 | 20% | 119 nm | 28.5 | 93.7 | 3.29 |
| 5 | 6 | 10/90 | 20% | 120 nm | 44.2 | 167.6 | 3.79 |
| 6 | 10 | 10/90 | 28% | 81 nm | 22.9 | 51.2 | 2.24 |

Antibacterial Performance

The antibacterial properties were determined according ASTM E2149-01: "Standard Test Method for Determining the Antimicrobial Activity of Immobilized Antimicrobial Agents Under Dynamic Contact Conditions". In addition a similar type of antibacterial test method was applied where coated test samples covered with a bacterial suspension were incubated for 24 hours at 30° C. Applied bacterial suspensions contained approximately $10^6$ CFU (Colony Forming Units) bacteria (*Escherichia coli* or *Staphylococcus aureus*) per mL. Surviving bacteria were counted as CFU. The antibacterial effect was expressed as the decrease in the number of bacteria on a logarithmic scale. A log 3 decrease, i.e. by factor of 1000, is generally considered as good antibacterial activity. A log 5 decrease is considered as excellent antibacterial activity.

Results regarding the antibacterial performance of examples 3 to 5 and Comparative examples 1 and 2 are given in Table 3 below.

TABLE 3

| Example | Antibacterial effect (log decrease) |
|---|---|
| 3 | Excellent (>5) |
| 4 | Excellent (>5) |
| 5 | Excellent (>5) |
| Comparative 1 | None (0) |
| Comparative 2 | None (0) |

Antistatic Performance

For determining the antistatic performance the emulsions were applied with a 6 micron wire rod at 20% solids on PEI primed OPP and dried for 10 seconds at 90° C. The PEI primer (formulated at 0.5% solids) was applied on OPP foil (untreated CDC-28 microns, available from Treofan) by reverse gravure with a RK-coater (cylinder speed 5 m/min (100 lpi); web speed of 10 m/min; average drying temperature of 85-90° C.). The antistatic properties of the dried coatings were measured using a Simco electrostatic field meter. The following charge measurements are recorded (all in kV): 1) the measured initial charge of the dry coating; 2) the measured charge directly after 10 times rubbing the coating surface with a dry woolen cloth (induced charge), and 3) the subsequent charge decay after 30 seconds and 5 minutes. The antistatic properties are determined from the induced absolute charge and the subsequent charge decay. Ideally, a good antistatic coating shows no or only little measurable charge and fast charge decay. Results are given in Table 4 below.

TABLE 4

| Example | Initial charge (kV) | Induced charge (kV) | Charge decay after 30 seconds (kV) | Charge decay after 5 minutes (kV) |
|---|---|---|---|---|
| 1 | 0.00 | −0.30 | 0.00 | 0.00 |
| 2 | 0.00 | −0.06 | 0.00 | 0.00 |
| 3 | −0.08 | −0.09 | −0.09 | −0.09 |
| 4 | −0.10 | −0.10 | −0.10 | −0.10 |
| 5 | 0.00 | 0.00 | 0.00 | 0.00 |
| 6 | 0.00 | −0.38 | 0.00 | 0.00 |
| 7 | 0.00 | +0.20 | 0.00 | 0.00 |
| Comparative 2 | 0.00 | +11.0 | +0.2 | +0.05 |

Determination of the Amount of Extractable Materials

To demonstrate the non-leachable character of the vinyl oligomer polymer examples a series of extraction experiments were performed on dried films obtained from vinyl oligomer polymers. Thereto a film of the vinyl oligomer polymer composition was applied at a wet layer thickness of 400 microns onto a glass plate coated with release paper. The film was dried for 4 hours at room temperature and an additional period of 16 hours at 50° C. to remove all the water from the film. The dried film was then carefully removed from the release paper coated glass plate, weighed on an analytical balance, and placed into a pre-cleaned glass jar of 800 mL. An amount of 500 grams of demineralised water was then added to the dried free film (approximately 3 to 5 grams was accurately weighed), and the glass jar was left to stand at room temperature for 24 hours. After 24 hours the free film was carefully removed from the jar and the remaining solution was concentrated via rotary evaporation (some toluene was added to facilitate the water removal). The concentrated solution was then further dried for several hours at 105° C. to remove any traces of volatiles, where after the residue was weighed on an analytical balance. The amount of extracted material (residue) is expressed as weight % of the total amount of dried free film that was subjected to extraction. Results for Examples 1 and 3 and Comparative examples 3 and 4 are shown in Table 5 below.

TABLE 5

| Example | Vinyl oligomer | Vinyl polymer (Tg 10° C.) | Amount extracted (wt % of total dried free film) |
|---|---|---|---|
| 1 | 1 | MMA/BA | 1.5% |
| 3 | 4 | MMA/BA | 1.5% |
| Comparative 3 | none | MMA/BA/ADAMQUAT (5%) | 3.5% |
| Comparative 4 | none | MMA/BA/APTAC (5%) | 3.7% |

Examples 1 and 3 show much less extracted material than Comparative examples 3 and 4 (while 10 wt % of water-soluble oligomer is present, only 1.5% of extracted material is found).

Antibleed Performance

The antibleed performance was determined on a merbau wood substrate. The emulsions were formulated with 1.5 wt % of a non-ionic surfactant (for vinyl oligomer polymers only), 1 wt % of Texanol and then 43 wt % of a white pigment paste, all on total emulsion. The formulations were left to stand for 16 hours and then applied with a brush on the merbau wood substrate. The coating was left to dry at room temperature for at least 16 hours, where after the antibleed performance of the applied primer coating was visually assessed by the degree of coloration of the dried coating layer. The degree of coloration was classified with a scale from 0 to 5, where 0 means very strong (typically red) coloration of the coating, i.e. very poor antibleed performance, and 5 means no coloration of the coating (remains white), i.e. excellent antibleed performance. This test was repeated with a second layer of primer coating applied onto the dried first primer layer, and with a high gloss top coating layer of a white-pigmented commercial acrylic polymer applied onto both the first and the second dried primer layer. The primer layers were dried for at least 16 hours at room temperature, whereas the top coat layers were dried for 4 hours at room temperature and then 16 hours at 50° C. For each of the four layers (primer, primer+primer, primer+topcoat and primer+primer+topcoat) the degree of coloration was determined after the indicated drying period.

In addition, for each of the layers a large droplet of demineralised water was placed for a period of 4 hours at room temperature on the dried coating layer, where after the coloration of this droplet was determined. The coloration of the droplet provides an indication of whether the coating is able to block or prevent the diffusion of wood constituents through the coating under humid conditions. The degree of coloration was classified with a scale from 0 to 5, where 0 means very strong (red) coloration of the water droplet and 5 means no coloration of the water droplet. Results are given in Table 6 below.

TABLE 6

| Example | primer (1 layer) | | primer (2 layers) | | primer (1 layer) + topcoat (1 layer) | | primer (2 layers) + topcoat (1 layer) | |
|---|---|---|---|---|---|---|---|---|
| | anti-bleed | water-spot | anti-bleed | water-spot | anti-bleed | water-spot | anti-bleed | water-spot |
| 1 | 2-3 | 3-4 | 4 | 4 | 5 | 5 | 5 | 5 |
| 2 | 2-3 | 3-4 | 4 | 4 | 5 | 5 | 5 | 5 |
| 6 | 2-3 | 3-4 | 4 | 4 | 5 | 5 | 5 | 5 |

The invention claimed is:

1. An aqueous emulsion comprising at least a covalently bound vinyl oligomer and vinyl polymer, wherein said vinyl oligomer comprises 5 to 85 mol % of vinyl monomers bearing quaternary ammonium ion functional groups and is obtained by a controlled radical polymerisation of at least one vinyl monomer via a reversible addition-fragmentation chain transfer mechanism in solution in the presence of a control agent and a source of free radicals; wherein said vinyl polymer is obtained by radical emulsion polymerisation of vinyl monomers in the presence of the vinyl oligomer; wherein the weight % ratio of vinyl oligomer to vinyl polymer is in the range of from 0.5:99.5 to 65:35.

2. An aqueous emulsion comprising at least a covalently bound vinyl oligomer and vinyl polymer, wherein said vinyl oligomer comprises 5 to 85 mol % of vinyl monomers bearing quaternary ammonium ion functional groups and is obtained by a controlled radical polymerisation of at least one vinyl monomer via a reversible addition-fragmentation chain transfer mechanism in the presence of a control agent and a source of free radicals; wherein said vinyl polymer is obtained by radical emulsion polymerisation of vinyl monomers in the presence of the vinyl oligomer.

3. An aqueous emulsion according to claim 1 wherein the vinyl oligomer is a block copolymer comprising at least a block [A] comprising an ethylenically unsaturated monomer bearing quaternary ammonium ion and / or quaternisable amine functional groups and optionally other ethylenically unsaturated monomers; and a block [B] comprising ethylenically unsaturated monomers selected from the group consisting of acrylates, methacrylates or vinyl monomers; and optionally a third block or more.

4. An aqueous emulsion according to claim 1 comprising:
   a) 10 to 100 wt % of covalently bound vinyl oligomer polymer;
   b) 0 to 40 wt of free vinyl oligomer;
   c) 0 to 90 wt % of free vinyl polymer;
   wherein a)+b)+c) add up to 100%.

5. An aqueous emulsion according to claim 1 wherein the weight % ratio of vinyl oligomer to vinyl polymer, whether covalently bound or free, is in the range of from 0.5:99.5 to 65:35.

6. An aqueous emulsion according to claim 1 wherein the Tg of the vinyl oligomer is in the range of from −100° C. to 0° C.

7. An aqueous emulsion according to claim 1 where the vinyl oligomer has a number average molecular weight $Mn \leq 50,000$ g/mol.

8. An aqueous emulsion according to claim 1 wherein the vinyl oligomer is a block copolymer.

9. An aqueous emulsion according to claim 1 where the covalently bound vinyl oligomer polymer has a weight average molecular weight $\geq 20,000$ g/mol.

10. An aqueous emulsion according to claim 1 where the vinyl polymer has a calculated $Tg \geq 0°$ C.

11. An aqueous emulsion according to claim 1, said emulsion comprising a vinyl oligomer in the form of a block copolymer and a vinyl polymer [P]; wherein the block copolymer comprises at least blocks $[A]_x[B]_y$, where at least block [A] is obtained by a controlled radical polymerisation of at least one ethylenically unsaturated monomer via a reversible addition-fragmentation chain transfer (RAFT) mechanism in solution in the presence of a control agent and a source of free radicals; and wherein the block copolymer comprises:

5 to 90 wt % of block [A] comprising:
   i) 10 to 100 mol % of ethylenically unsaturated monomers bearing quaternary ammoniumiun ion functional groups;

ii) 0 to 90 mol % of ethylenically unsaturated monomers bearing water-dispersing or potentially water-dispersing functional groups;
iii) 0 to 50 mol % of $C_1$ to $C_{18}$ alkyl (meth)acrylates and/or styrenic monomers;
iv) 0 to 10 mol % of ethylenically unsaturated monomers different from those from i), ii) and iii);
where i), ii), iii) and iv) add up to 100 mol %, and
10 to 85 wt % of block [B] comprising:
i) 0 to 10 mol % of ethylenically unsaturated monomers bearing quaternary ammonium ion functional groups;
ii) 0 to 5 mol % of ethylenically unsaturated monomers bearing water-dispersing or potentially water-dispersing functional groups;
iii) 50 to 100 mol % of $C_1$ to $C_{18}$ alkyl (meth)acrylates and/or styrenic monomers;
iv) 0 to 50 mol % of ethylenically unsaturated monomers different from those from i), ii) and iii);
where i), ii), iii) and iv) add up to 100 mol %; and
wherein vinyl polymer [P] is prepared by radical emulsion polymerisation of vinyl monomers in the presence of blocks $[A]_x[B]_y$, wherein vinyl polymer [P] comprises:
i) 0 to 5 wt % of ethylenically unsaturated monomers bearing quaternary ammonium ion functional groups;
ii) 0 to 5 wt % of ethylenically unsaturated monomers bearing water-dispersing or potentially water-dispersing functional groups;
iii) 40 to 100 wt % of $C_1$ to $C_{18}$ alkyl (meth)acrylates and/or styrenic monomers;
iv) 0 to 60 wt % of ethylenically unsaturated monomers different from those from i), ii) and iii);
where i), ii), iii), and iv) add up to 100 wt %;
where [A] has an average degree of polymerisation x, where x is an integer in the range of from 3 to 80;
where [B] has an average degree of polymerisation y, where y is an integer ≥3.

12. An aqueous emulsion according to claim 1 wherein the control agent is selected from the group consisting of dithioesters, thioethers-thiones, trithiocarbonates, dithiocarbamates, xanthates and mixtures thereof.

13. An aqueous emulsion comprising a substantially insoluble vinyl oligomer in the form of a block copolymer comprising at least blocks $[A]_x[B]_y$, where at least block [A] is obtained by a controlled radical polymerisation of at least one ethylenically unsaturated monomer via a reversible addition-fragmentation chain transfer (RAFT) mechanism in solution in the presence of a control agent and a source of free radicals; and wherein the block copolymer comprises:
5 to 90 wt % of block [A] comprising:
i) 10 to 100 mol % of ethylenically unsaturated monomers bearing quaternary ammonium ion functional groups;
ii) 0 to 90 mol % of ethylenically unsaturated monomers bearing water-dispersing or potentially water-dispersing functional groups;
iii) 0 to 50 mol % of $C_1$ to $C_{18}$ alkyl (meth)acrylates and/or styrenic monomers;
iv) 0 to 10 mol % of ethylenically unsaturated monomers different from those from i), ii) and iii);
where i), ii), iii) and iv) add up to 100 mol %, and
10 to 85 wt % of block [B] comprising:
i) 0 to 10 mol % of ethylenically unsaturated monomers bearing quaternary ammonium ion functional groups;
ii) 0 to 5 mol % of ethylenically unsaturated monomers bearing water-dispersing or potentially water-dispersing functional groups;
iii) 50 to 100 mol % of $C_1$ to $C_{18}$ alkyl (meth)acrylates and/or styrenic monomers;
iv) 0 to 50 mol % of ethylenically unsaturated monomers different from those from i), ii) and iii);
where i), ii), iii) and iv) add up to 100 mol %;
where [A] has an average degree of polymerisation x, where x is an integer in the range of from 3 to 80;
where [B] has an average degree of polymerisation y, where y is an integer ≥3.

14. An aqueous emulsion according to claim 1 additionally comprising a polymer [Q], wherein the solids content of the vinyl oligomer polymer is ≥1 wt % and ≤35 wt % based on total solids content of vinyl oligomer polymer and polymer [Q] together.

15. A process for preparing an aqueous emulsion according to claim 1 comprising the following steps:
1. synthesis in a solvent by means of a RAFT radical polymerisation process of an vinyl oligomer;
2. optional removal of the control agent before, during or after dispersing said vinyl oligomer in water;
3. optional removal of the solvent from said vinyl oligomer;
4. dispersion of said vinyl oligomer in water optionally containing monomers, by adding either water to the vinyl oligomer or adding the vinyl oligomer to water, optionally using surfactants;
5. optional removal of solvent from the vinyl oligomer dispersion (if solvent is still present from step 4.);
6. performing an emulsion polymerisation process of monomers in the presence of the vinyl oligomer dispersion prepared in step 4 and or step 5 to obtain vinyl polymer.

16. A coating having a permanent cationic surface comprising an aqueous emulsion according to claim 1.

17. An antimicrobial agent comprising an aqueous emulsion according to claim 1.

18. An antimicrobial surface obtained by coating a surface of a substrate with an aqueous emulsion according to claim 1.

19. An antistatic surface obtained by coating a surface of a substrate with an aqueous emulsion according to claim 1.

20. An antibleeding coating comprising an aqueous emulsion according to claim 1.

21. A substrate coated with a primer coating comprising an aqueous emulsion according to claim 1 and at least one top coating.

* * * * *